Nov. 29, 1938.     P. E. MERCIER     2,138,352
AIRPLANE WING STRUCTURE
Filed April 21, 1937     4 Sheets-Sheet 1

INVENTOR:
PIERRE ERNEST MERCIER
BY Haseltine, Lake & Co.
ATTORNEYS

Nov. 29, 1938.   P. E. MERCIER   2,138,352
AIRPLANE WING STRUCTURE
Filed April 21, 1937   4 Sheets-Sheet 2
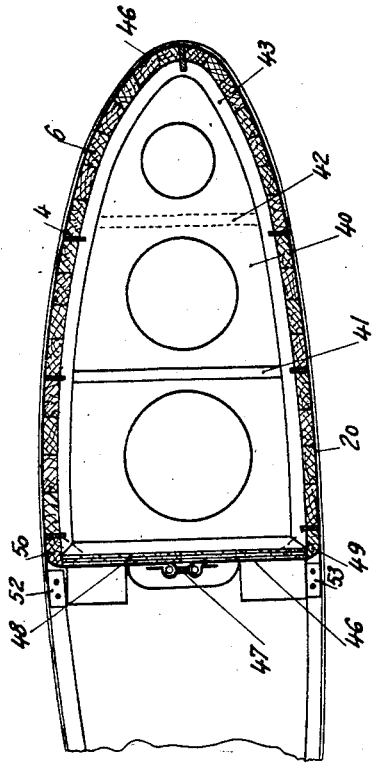
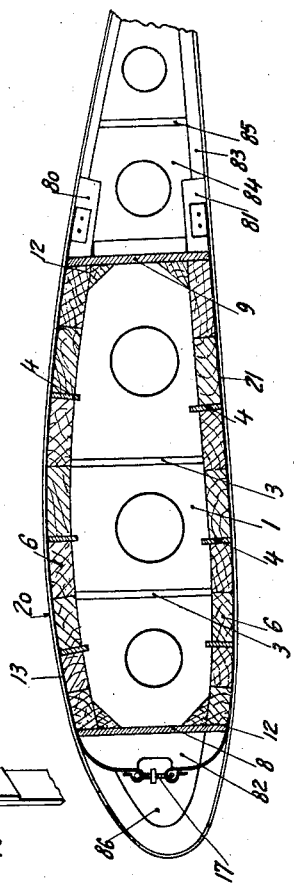
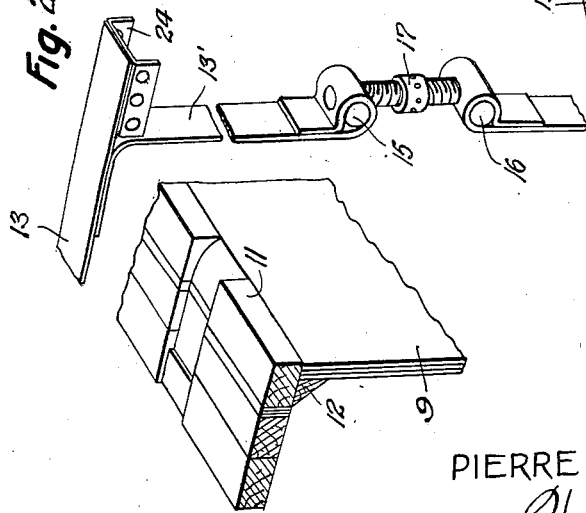
INVENTOR:
PIERRE ERNEST MERCIER
BY Haseltine Lake & Co.
ATTORNEYS

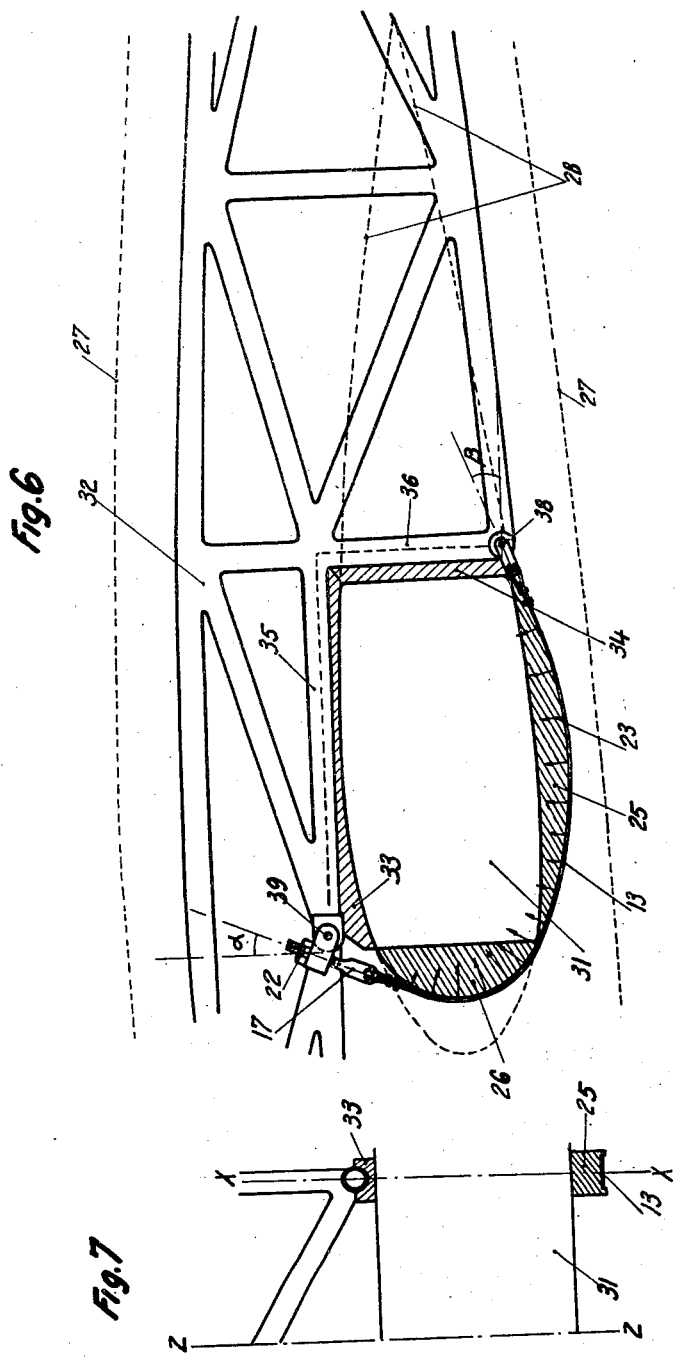

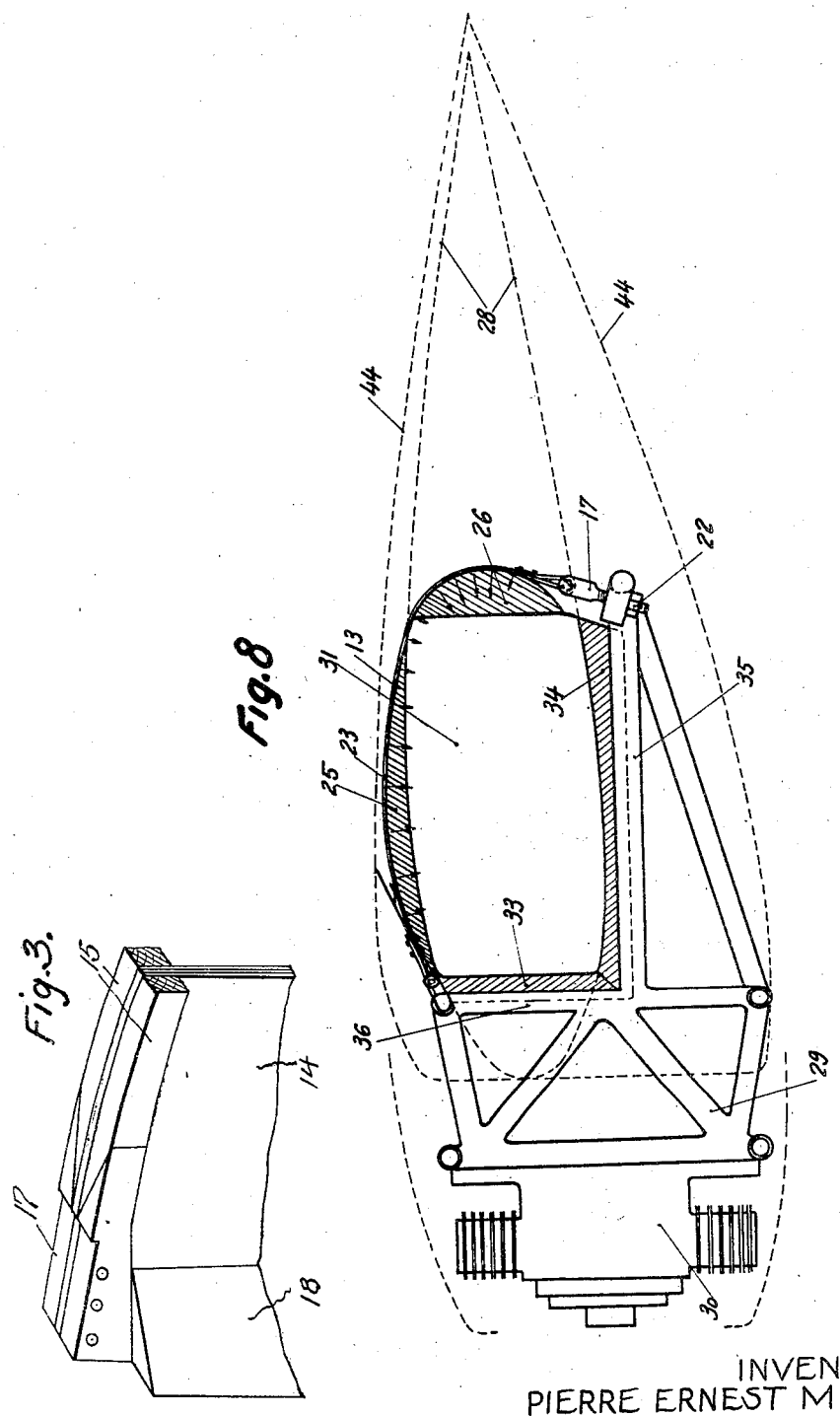

Patented Nov. 29, 1938

2,138,352

UNITED STATES PATENT OFFICE 2,138,352

AIRPLANE WING STRUCTURE

Pierre Ernest Mercier, Paris, France

Application April 21, 1937, Serial No. 138,125
In France April 29, 1936

14 Claims. (Cl. 244—123)

This invention relates to improved hooped caisson structures or wing spars for aircraft.

The advantage of tubular or caisson structures for aeronautical purposes is well known and is due to the fact that the material employed to support or withstand flexing efforts in the framework of an aircraft is able to resist torsional forces superposed upon other forces produced in the structure, without the total fatigue of the said elements being thereby generally increased to an important amount, the structure thus formed also possessing considerable rigidity. The difficulty of curving and assembling together very thick plates makes the construction of wing caissons in wood or similar material difficult and comparatively expensive, for which reason there is frequently used in this class of construction a composite arrangement comprising a working covering of medium thickness reinforced by ribbands arranged at various intervals. This method of construction has the disadvantage of only imparting to the structures in question a portion of the advantages of a tube.

The object of the invention is a novel construction in caisson structures which avoids the above-mentioned drawbacks and is easy to manufacture using simple elements, and is more particularly applicable to the supporting surfaces of aircraft and is characterized by the combined use:

On the one hand, of a certain number of strong ribbed frames within the caisson.

On the other hand, resting on the contour of the said frames or strong ribs, of elements or staves of prismatic shape attached one to the other to form members located in planes or surfaces parallel or slightly convergent with respect to each other, these elements being supplemented where the contour of the section of the caisson is not entirely curvilinear by plates which may be perforated and which may be built up or formed in a single piece, to complete the prismatic element on the contour of the section of the caisson, the rigidity of the whole being ensured or reinforced during and after the attachment of the elements constituting the caisson by straps arranged externally of the caisson which embrace it on its contour in the manner of hoops provided around a barrel formed of strakes.

The invention is furthermore characterized by the following particular arrangements taken severally or in combination within the scope of the principal feature:

(a) The interposition of locating elements between certain of the elements of prismatic shape, the said locating elements having on the side thereof directed towards the interior of the caisson, projecting shoulders, stops or notches which ensure the spacing and location of the frames in the interior of the caisson.

(b) The construction of the preferably metallic straps which embrace the caisson transversely so as to comprise in the region of its angles or at suitable points, extensions which serve as anchorages for a secondary framework, such as that of the leading edge or trailing edge of a wing, external of the caisson and ensuring the shape of the wing surface at the level of their point of attachment to the said caisson which constitutes the principal carcase of the wing.

(c) The construction of the aforesaid straps so as to comprise stretches suitably placed and if necessary supplemented by springs, Belleville washers or the like having for their object to maintain the tension of the straps approximately constant whatever may be the variations in volume of the elements constituting the caisson under the effects of temperature and humidity variations.

(d) The arrangement of a sheet of plywood or equivalent thin material so as to cover the caisson and its straps and eliminate any unevenness which might be injurious to the aerodynamical properties of the structure.

It will be clear that without departing from the scope of the invention, the use of all or a portion of the straps could, in a simplified embodiment, be limited to the stage of the manufacture and assembly of the caisson structure. The attachment to the principal caisson of the leading and trailing edges of wings or the like would then be ensured by anchorings independent of the straps.

In the same way, the curving of the surfaces of the caisson by the straps need not extend completely around the caisson and could be limited to a portion only (or to several portions) of the periphery of the caisson, the extremities of the straps being suitably fixed and the clamping means suitably distributed and fitted on the portion or portions of the periphery of the caisson subjected to the clamping strain.

The invention is also applicable to the manufacture of fuselages or other hollow bodies of general use or in aerodynamics.

In particular the method of construction described may be applied as follows: either for fixing additional framework elements such as motor frames or landing gear to a caisson, by means of straps and suitable intermediate parts serving as support: or for fixing the caisson itself by means of straps and suitable supports to another framework, for example, to the framework of a corresponding fuselage.

The invention will be better understood by reference to the accompanying drawings and the following description relating thereto, which give by way of non-restrictive examples, various embodiments thereof.

In the drawings:

Figure 2 shows a detail in the region of one of the caisson angles in which a recess is formed for the corresponding strap, and, detached, the strap in question with an extension for forming an anchorage and a tensioning device for the strap;

Figure 3 shows the detail of a leading edge rib, in the region of its point of attachment to the anchorage shown on Figure 2;

Figure 4 shows in section a wing caisson constructed in accordance with the invention for forming the leading edge of an aircraft wing of which it constitutes the carcase, and comprising only one flat web, namely that at the rear of the caisson;

Figure 5 shows in cross-section a wing caisson constructed in accordance with the invention in which the strapping is only applied on a portion of the total periphery of the caisson;

Figures 6 to 8 show two particular embodiments of the invention and in particular:

Figure 6 represents the connection of the caisson forming the principal carcase of a wing, to a fuselage comprising an inner framework of welded tubes;

Figure 7 represents a detail of Figure 6 seen in a plane perpendicular to that of the latter figure, and Figure 8 shows the suspension of a motor frame fitted on a wing caisson similar to that of Figure 6.

Figure 1:
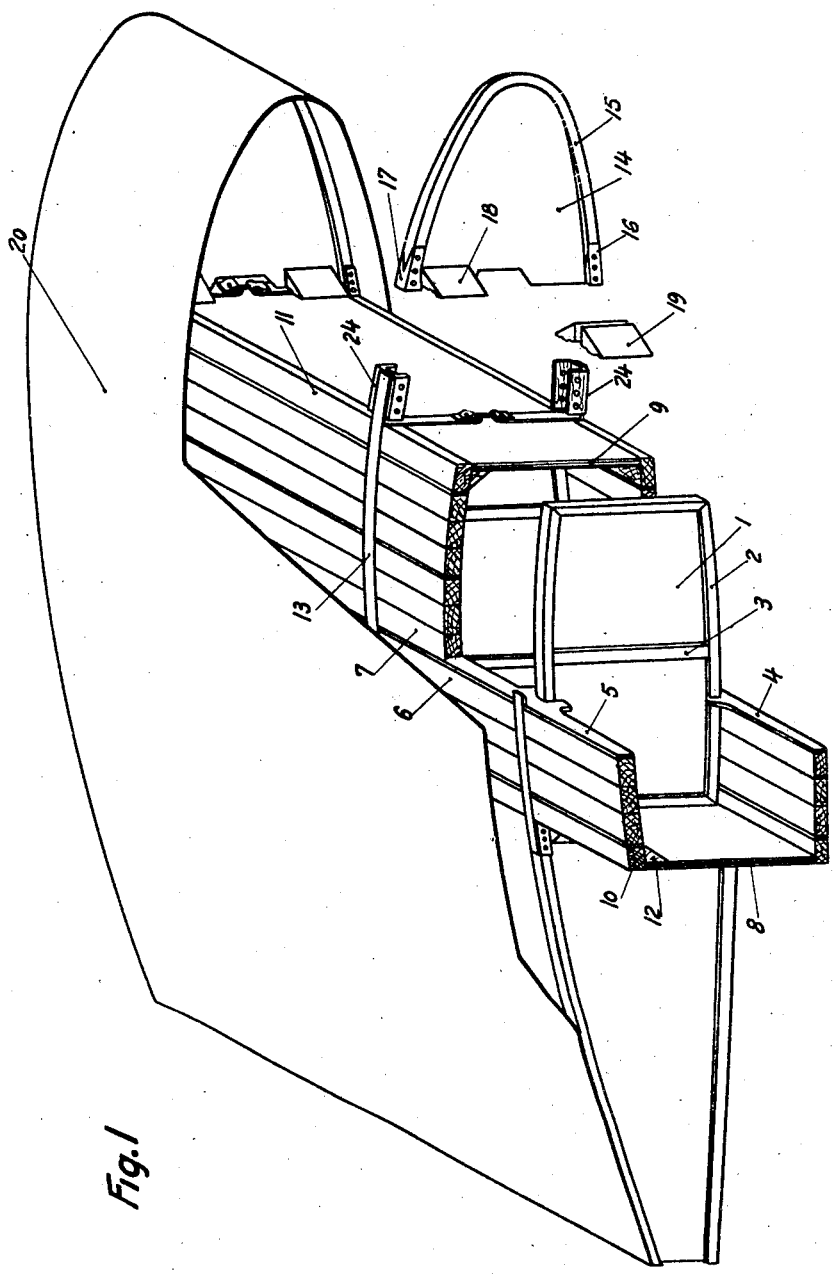
Figure 1 shows a view in perspective with a part broken away of a wing of an aircraft comprising a caisson structure or wing spar in accordance with the invention.

Referring to Figures 1, 2 and 3, the wing caisson comprises transverse frames built of a web 1 for example of plywood, provided with a reinforcement 2 on its periphery and supplemented by an upright 3. The position of the frame in the interior of the caisson is ensured by notches provided in particular supplementary elements such as 4 and 5, interposed between elements of prismatic shape such as 6 and 7 of which the upper and lower walls of the caisson are built up. The prismatic elements are cemented together with adhesive. Webs 8 and 9 close the caisson at the front and rear on two parallel vertical planes and are attached to the prismatic elements such as 10 and 11 at the angles of the caisson by cleats of triangular section such as 12.

Straps 13 (preferably made of thin rustless steel strip) embrace the caisson. The angle elements such as 10 and 11 are of hardwood or are protected by a sheet metal plate at the location of the straps, the elements being suitably grooved as shown in Figure 2.

The structure of the leading edge of the wing comprises ribs 14 bordered by reinforcements 15 which terminate at 16, 17 by attached elements of hardwood or the like which are inserted in extensions 24 of the straps 13. The straps 13 comprise bands assembled to elements such as 13′ (Figure 2) by riveting or welding and small U-shaped members 24 for anchoring the leading edge ribs. The tensioning of the strap is effected by a rod 17 having two oppositely screw threaded ends which screw into tapped holes in short rods 15 and 16 held in the ends of the strap.

Fillet pieces 18 and 19 suitably recessed to permit the play of the strap transmit the forces applied to the ribs 14 on to the web 9 after the final assemblage. The same arrangements are applicable to the rib ends attached to the web 8 of the caisson opposite the web 9. A sheet of plywood or fabric or the like indicated at 20 covers the complete structure.

Inspection apertures or removable portions of the leading or trailing edges may naturally be made in the structure according to the invention, as is usually done in constructions already well known to experts, these apertures being covered for example by hinged or screwed panels, etc.

In the wing structure shown in Figure 4, the transverse rib 40 of the caisson comprises uprights 41 and 42 and a peripheral reinforcement 43 for the web and on which rest the elements of prismatic shape such as 6, between some of which locating elements 4 are provided to ensure the correct location of the ribs. A flat web 48 closes the caisson at the back. The caisson is surrounded by straps 46 which are provided with tensioning members 47 similar to those described in Figure 2. The angle elements 49 and 50 are reinforced at the location of the straps. Sheet plywood 20 covers the whole structure. Anchorings 52 and 53 are provided for attaching the ribs of the trailing edge to the principal caisson similarly to those described with reference to Figures 1 to 3.

In the wing structure shown in Figure 5 the prismatic elements 6, between some of which are interposed notched locating elements 4, are supported on transverse frames 1 provided with reinforcements 3. The caisson is limited in two vertical planes at the front and rear by webs 8 and 9 fixed by adhesive, with reinforcement of the angles by triangular fillets 12, to the prismatic elements located at angles of the caisson. The straps 13 and 21 are terminated towards the rear of the caisson on blocks 80 and 81 which abut under the traction effort, against the outermost prismatic elements of this side with the interposition of the web 9. The pull on the straps is effected by a double screw tensioning device 17 fitted in front in a recess formed in an upright 82 fitted on the web 8 and which is curved in such a manner as to present rounded parts facilitating the sliding of the strap in tensioning where it changes its direction. The blocks 80 and 81 serve at the same time as anchoring means for the ribs 83 constituting with inner hollowed webs 84 and struts 85, the supporting framework of the trailing edge of the wing. In the front of the wing, the leading edge is supported by a framework of the same kind as the rear edge with a web 86 resting against the vertical web or wall 8 of the caisson. The whole structure (framework of the leading edge, caisson and framework of the trailing edge) is covered by a continuous coating 20 formed, for example, of thin plywood.

The process of construction described naturally lends itself easily to the production of trapezoidal wings, or of any surfaces whatever, since the elements of prismatic shape may have a varying section of any kind in the sense of the width of the wing, being arranged to abut together on flat surfaces. In the same way, the construction of a caisson of equal resistance on its spread may be simply effected, it being sufficient suitably to diminish the thickness of the said elements in the sense of the spread or width of the caisson.

Examples will now be described of attachment between the wing caisson and other elements of the aircraft. For the sake of clearness, in Figures 6 and 7 the caisson 31 has not been shown in section but only by its outer contour, the interior of the caisson being left blank. The fuselage framework 32 comprises tubular elements 35 and 36 which make, for example, a right angle and against which rests the caisson through the intermediary of members or blocks 33 and 34 of suitable shape.

The framework 32 also carries at 38 and 39 two anchoring devices to which are attached the extremities of a strap 13. There is shown diagrammatically at 17 a tensioning screw with a nut 22 by means of which the tension of the strap is adjusted.

Blocks of suitable shape 25 and 26 are also interposed between the strap and the caisson. These blocks determine the degree of equilibrium of the strap under the action of the forces applied thereto, as also the angles α and β of its extremities with respect to the framework. The arrows 23 indicate diagrammatically the forces applied by the strap on the blocks 25 and 26 and through the intermediary of the latter, on to the caisson.

It is to be understood that Figure 6 only represents one of a number of the devices for fixing the caisson to the fuselage, other similar devices being arranged symmetrically with respect to the axis of the fuselage. This is indicated diagrammatically in Figure 7 drawn in a plane perpendicular to that of Figure 6 and which shows one of the fixing devices located to one side of the centre line of the fuselage.

Figure 7 shows at ZZ the vertical axis of the fuselage and at XX the line of the plane of Figure 6. Another plane of an identical framework but not shown, would be projected symmetrically with XX with respect to the axis ZZ but on the other side. It is furthermore evident that the invention is not restricted to any particular number of fixing planes but that there could be any number thereof as desired. It is also to be understood that the portions 35 and 36 of the fuselage on which the caisson rests through the intermediary of the blocks 33 and 34 could with advantage in certain cases be curved and not straight, and that they could if necessary comprise notches or cusps. It should also be understood that these parts 35 and 36 could form between themselves any suitable angle, that they could be arranged according to a number of interrupted lines or be reduced on the contrary to a single piece in order to shoulder the caisson only on a single face.

The dotted lines 27 and 28 on Figure 6 represent in a diagrammatic manner the exterior contours of the wing and the fuselage of the aircraft.

In the interior of the caisson, although they are not represented, there are naturally arranged frames supporting the effort of each of the straps according to Figure 1.

Figure 8 represents an arrangement for fixing on a caisson 31 (the inner space of which is again left blank) a motor 30 supported by a frame 29. This figure comprises essentially the same elements as Figure 6, that is to say, at 35 and 36 the parts of the frame which rest on the caisson, at 33, 34, 25 and 26 the blocks which are interposed between the strap 13 and the caisson or between the latter and the framework, at 17 and 22 the tensioning device of the strap and its tightening nut and at 23 an indication of the forces exerted by the strap on the blocks. There is also shown by a dotted line at 28 the contour of the wing and at 44 the contours of the fairing of the motor.

Here, again, it is to be understood that the complete device for fixing the motor on the caisson comprises the repetition in different planes of a number of systems similar to that which is represented in Figure 8. It is also to be understood that the parts 35 and 36 of the fuselage could be inclined at any desired angle, be curved instead of straight, could be reduced to a single member, and may comprise notches or cusps. It must finally be understood that at right angles to the straps the caisson comprises in the interior, transverse frames serving as support therefor.

The method of connection of the caisson to the fuselage or motor frame in accordance with the invention which has been described in these two particular applications but which must be considered as of entirely general application, presents, inter alia, the following advantages:

It eliminates the use of screws or nails at the positions of the fixing of the caisson to adjacent frameworks, It permits the juxtaposition, without fear of dangerous local fatigues, of different materials (framework in steel for example and caisson of wood), the great flexibility of the straps preserving the strength of the assemblage without destroying its suppleness, It facilitates the interchangeability of the members connected together and permits wide tolerances to be used in working.

The system of construction of the structures of aircraft as above explained is naturally capable of numerous variations in actual construction and of application, as will be obvious to an expert, without departing from the scope of the invention. Thus, for example, the parts in wood constituting the soles, may evidently have any section according to the number and the arrangement of the planes of fixture of these elements between themselves. To simplify their working, there may be used as a modification, thin elements covering each other and assembled by fixing on a mould. In the same way without departing from the invention, there may be substituted for the wood any similar materials such as wood coated with Bakelite, fabrics coated with Bakelite, etc.

What I claim as my invention and desire to secure by Letters Patent of the United States is:—

1. A wing structure for an aircraft comprising a plurality of transverse partitions arranged in essentially parallel planes, staves of wood assembled by gluing and arranged on the periphery of the partitions essentially at right angles to the planes thereof, and hoop means binding the wood staves to the frames.

2. A wing structure for an aircraft comprising a plurality of transverse partitions arranged in essentially parallel planes, staves of wood of prismatic shape assembled by gluing and disposed on the periphery of the partitions essentially at right angles to the planes thereof, and hoop means binding the wood staves to the frames.

3. A wing structure for an aircraft comprising a plurality of transverse partitions arranged in essentially parallel planes, staves of wood of prismatic shape assembled by gluing and disposed on the periphery of the partitions essentially at right angles to the planes thereof, the section of the wood staves varying according to the length thereof, and the planes of gluing being convergent, and hoop means binding the wood elements to the frames.

4. A wing structure for an aircraft comprising a plurality of transverse partitions arranged in essentially parallel planes, elements of wood of prismatic shape assembled by gluing and disposed on the periphery of the partitions essentially at right angles to the planes thereof, thin supplementary elements held between some of the prismatic elements and comprising locating means coacting with the periphery of the transverse partitions, to locate the same in position, and hoop means binding the wood elements to the frames.

5. A wing structure for an aircraft comprising a plurality of transverse partitions arranged in essentially parallel planes, staves of wood assembled by gluing and disposed on a portion of the periphery of the partitions essentially at right angles to the planes thereof, at least one thin and light flat wall arranged on another portion of the periphery of the partitions and fixed to the outer staves of wood, and hoop means binding the wood staves to the frames.

6. A wing structure for an aircraft comprising a plurality of partitions arranged in essentially parallel planes, staves of wood assembled by gluing and disposed on the periphery of the partitions essentially at right angles to the planes thereof, metallic straps forming hoops binding the staves of wood to the frames and means operable mechanically to tighten the said straps.

7. A wing structure for an aircraft comprising a plurality of partitions arranged in essentially parallel planes, staves of wood assembled by gluing and disposed on the periphery of the partitions essentially at right angles to the planes thereof, metallic straps forming hoops extending over a portion only of the periphery of the spar and binding the staves of wood to the frames, means for anchoring one extremity of each strap and means operable mechanically to tighten the said straps.

8. A wing structure for an aircraft comprising a plurality of partitions arranged in essentially parallel planes, staves of wood assembled by gluing and disposed on the periphery of the partitions, essentially at right angles to the planes thereof, the exterior surface of the said elements having transverse recesses therein, metallic straps located in the said recesses and binding the wood staves to the frames, and means operable mechanically to tighten the said straps.

9. In an aircraft a wing spar comprising a plurality of partitions arranged in essentially parallel planes, staves of wood assembled by gluing and disposed on the periphery of the partitions essentially at right angles to the planes thereof, metallic straps forming hoops binding the said staves of wood to the frames, attachment elements secured to the said straps and adapted to take elements of a secondary framework of said aircraft, and means operable mechanically to tighten the said straps.

10. An airplane wing spar comprising a caisson-like structure formed by a plurality of partitions arranged in essentially parallel planes, elements of wood assembled by gluing and disposed on the periphery of the partitions essentially at right angles to the planes thereof, metallic straps forming hoops binding the said elements of wood to the frames and comprising attachment elements, means for mechanically tightening the said straps and a trailing edge structure of the wing fixed to the said attachment elements.

11. An airplane wing spar comprising a caisson-like structure formed by a plurality of partitions arranged in essentially parallel planes, elements of wood assembled by gluing and disposed on the periphery of the partitions essentially at right angles to the planes thereof, metallic straps forming hoops binding the said elements of wood to the frames and comprising attachment elements, means for mechanically tightening the said straps and a leading edge structure of the wing fixed to the said attachment elements.

12. An airplane wing spar comprising a caisson-like structure formed by a plurality of partitions arranged in essentially parallel planes, elements of wood assembled by gluing and disposed on the periphery of the partitions essentially at right angles to the planes thereof, the periphery of the caisson forming the leading edge of the wing, metallic straps forming hoops binding the said elements of wood to the frames and comprising attachment elements, means for mechanically tightening the said straps, and a trailing edge structure of the wing fixed to the said attachment elements.

13. An aircraft comprising a wing spar and annexed frameworks, the wing spar comprising a plurality of partitions disposed in essentially parallel planes, elements of wood assembled by gluing and disposed on the periphery of the partitions essentially at right angles to the planes thereof, metallic straps forming hoops binding the elements of wood to the frames and extending over a portion only of the periphery of the spar, means for anchoring one extremity of each strap to the said adjacent frameworks and means for mechanically tightening the said straps.

14. An aircraft comprising a wing spar and annexed frameworks, forming a dihedral angle in which are arranged two faces of the wing spar, the said structure comprising a plurality of partitions disposed in essentially parallel planes, elements of wood assembled by gluing and disposed over the periphery of the partitions essentially at right angles to the planes thereof, metallic straps forming hoops binding the elements of wood to the frames and extending over the faces of the wing spar other than the aforesaid two faces, blocks interposed between the spar and the straps and defining an outer convex profile, means for anchoring one extremity of each strap to the said adjacent frameworks and means for mechanically tightening the said straps.

PIERRE ERNEST MERCIER.